US008545182B2

(12) United States Patent
Sørensen (10) Patent No.: US 8,545,182 B2
(45) Date of Patent: Oct. 1, 2013

(54) WIND TURBINE BLADE AND HUB ASSEMBLY

(75) Inventor: Tommy Sørensen, Lemming (DK)

(73) Assignee: LM Glasfiber A/S, Kolding (DK)

( * ) Notice: Subject to any disclaimer, the term of this patent is extended or adjusted under 35 U.S.C. 154(b) by 580 days.

(21) Appl. No.: 12/812,625

(22) PCT Filed: Jan. 13, 2009

(86) PCT No.: PCT/DK2009/000008
§ 371 (c)(1),
(2), (4) Date: Jul. 13, 2010

(87) PCT Pub. No.: WO2009/089833
PCT Pub. Date: Jul. 23, 2009

(65) Prior Publication Data
US 2010/0290912 A1 Nov. 18, 2010

(30) Foreign Application Priority Data

Jan. 14, 2008 (EP) ..................................... 08000537

(51) Int. Cl.
*B64C 11/06* (2006.01)
(52) U.S. Cl.
USPC ...................... 416/204 R; 416/248
(58) Field of Classification Search
USPC ............................ 416/248, 244 R, 239, 204 R
See application file for complete search history.

(56) References Cited

U.S. PATENT DOCUMENTS

| 4,412,784 | A | * | 11/1983 | Wackerle et al. | ............. | 416/230 |
| 7,530,168 | B2 | | 5/2009 | Sorensen et al. | | |
| 2007/0065288 | A1 | | 3/2007 | Sorensen et al. | | |
| 2007/0231146 | A1 | * | 10/2007 | Birkemeyer et al. | ..... | 416/204 R |
| 2009/0016885 | A1 | * | 1/2009 | Bech | .............................. | 416/155 |

FOREIGN PATENT DOCUMENTS

| DE | 39 22 199 | C1 | 7/1990 |
| DE | 10 2005 026 141 | A1 | 7/2006 |
| WO | 03/019004 | A1 | 3/2003 |
| WO | 2007/003866 | A1 | 1/2007 |

* cited by examiner

*Primary Examiner* — Richard Edgar
(74) *Attorney, Agent, or Firm* — Nath, Goldberg & Meyer; Jerald L. Meyer; Sanjana Mangalagiri (57) ABSTRACT

This invention relates to a wind turbine blade with at least two connection members such as bushings and/or threaded bars in the root of the blade for attaching the blade to a hub. The connection members are placed along the blade surface and at least some of the connection members are non-parallel and hence oriented in different directions. Hereby is obtained that the root section of the blade can be shortened and the maximum chord of the wind turbine blade can be moved closer to the hub, whereby the part of the blade exploiting the wind is increased and the power output similarly increased.
The present invention further relates to a pitch bearing and a hub comprising a bearing ring with two or more holes for positioning fastening members for attaching a wind turbine blade to the bearing. Here, correspondingly, at least two of the holes are oriented in different angles so that the fastening members positioned in the holes are non-parallel and extend in different directions.

11 Claims, 7 Drawing Sheets

WIND TURBINE BLADE AND HUB ASSEMBLY

This is a National Phase Application filed under 35 U.S.C. §371 as a national stage of PCT/DK2009/000008, filed on Jan. 13, 2009, claiming the benefit of European Patent Application 08000537.4, filed on Jan. 14, 2008, the content of each of which is hereby incorporated by reference in its entirety.

FIELD OF THE INVENTION

The present invention concerns a turbine blade for a wind energy plant and its connection to a bearing and a hub for a wind power installation.

BACKGROUND

The blades for a wind energy plant are for the most part shaped as aerodynamical profiles in order to exploit the wind power optimally. The blades are connected to the hub often via one or more bearings, whereby the loads are transferred to the hub and to a certain degree to the rotor shaft. The loads comprise both the (intentional) rotational forces, centrifugal forces, gravity forces and forces, loads and moments arising out of the action of the wind on the rotor blades. The wind turbine blades can be rigidly connected to the hub, but most modern wind turbines can regulate and adjust the position of the blades for instance by pitch regulation and/or by coning. Therefore, the blades are often connected to the hub via bearings of some kind, for instance a circular pitch bearing allowing each blade to be turned around its pitch axis.

Today, wind turbine blades are typically made of fiber reinforced laminates in order to obtain strong yet light constructions. Such blades are connected to the circular bearing in the hub by means of a number of rods or bolts extending from the blade root in parallel to the pitch axis and being fastened to the blade by bushings or wedges embedded in the blade laminate. In attempts to solve the problem of ensuring a proper engagement of the bushings and obtaining a proper load transfer to the surrounding laminate, different designs of the bushings and the laminate built-up have been suggested, e.g. WO 2003/082551, WO 2004/110862, WO 2006/070171; however, this still remains a field for ongoing research.

The fastening of the rods to the blade and the load transfer from the blade to the hub further requires that the blade be shaped with a right root cylinder of a certain minimum length in which the bushings are placed. The root cylinder is then morphed into the aerodynamically optimized part of the blade. The root section—defined as the blade part extending from the hub and the very root of the blade to the position of the blade profile with maximal chord—can be in the order of 10 m on a 60 m long blade. The disadvantage of the root section is of course that the wind forces are not optimally exploited in this region closest to the hub. In Wobben, WO 2004/097215, this problem is suggested solved by applying a foldable rear edge section or a cladding which is fastened onto the load bearing 'skeleton' of the blade.

OBJECT AND SUMMARY OF THE INVENTION

It is therefore an object of the present invention to provide a blade for a wind energy plant and a hub assembly and design allowing for a better wind power extraction in the region close to the hub, and where some of the above-mentioned disadvantages are overcome or reduced.

According to one aspect, the present invention relates to a blade for a wind power plant comprising at least two bushings in the root of said blade for attaching said blade to a hub, and where said bushings are placed along the blade surface, and where at least some of said bushings are non-parallel. The bushings considered are as stated placed along the blade surface, i.e. for instance more or less embedded or placed in between some of the layers in the laminate in the case of a blade made of fiber reinforced composites or in other words placed substantially lengthwise the blade or more or less along the length of the blade in contrast to being positioned crosswise the blade thickness. Also, here and throughout the document, a bushing is to be understood broadly as an insert or hole which in some way is capable of receiving and securing or bracing some sort of fastening member and can therefore within the scope of invention and as known by a person skilled in the art be in the shape of for instance a conventional bushing with an internal thread, a hole or a tube with a cross pin etc.

Hereby is obtained that the root section of the blade in which the bushings are placed does not need to be in the shape of a circular right cylinder as is otherwise traditionally the case when the bushings are all parallel. Instead the bushings are allowed to be oriented in different directions, and the blade transition from having a blade profile into the root end (which is most often circular in order to fit onto a circular bearing) can hence be more gradual and shaped more freely and naturally. This is further advantageous in enabling a blade with a much shorter root section and where the blade profile with a maximum length of chord can be brought much closer to the hub. Hereby the annual power production for a blade of a given length is increased, or alternatively the same power yield can be obtained with shorter and hence not as heavy blades. Shorter blades are advantageous in reducing the risk of tower collision as the blades are often quite flexible and bend considerably in the wind. Weight reduction of the blades is also advantageous in reducing the loads on gears, bearings, etc in the wind power plant.

Further, as the bushings in the blade according to the invention can extend in different directions it is achieved that the blade can be designed more freely with the possibility of obtaining a better, more natural shape of blade avoiding greater curvatures. This is advantageous in decreasing the stresses in blade root, thereby also decreasing the risks of damage and wear in blade laminate as well as resulting in a better load transfer from the blade to bearing and the hub.

Furthermore, as at least some of the bushings are angled, the effective length of the bushings (the length component along the length of the blade and/or pitch axis) is also decreased. This in turn implies that the required length of the root section of the blade can be further reduced.

Also, according to the above the bushings can be described angled in such manners that the force required to tear or pull out the bushings from the surrounding laminate is greatly increasing, hereby achieving a stronger assembly of the blade to the hub. This in turn implies that the thickness of the blade laminate in the root can be decreased without implication to the strength of the assembly whereby weight and material can be saved.

In another embodiment of the invention, the blade for a wind power plant according to the above comprises bushings unevenly distributed in the root end of the blade. Hereby is obtained that the bushings can be placed according to loads distribution in the blade.

In a further embodiment, at least some of said bushings in the blade for a wind power plant according to the above are placed closer to each other in the upwind and/or downwind side of the blade. This is advantageous as the bushings placed in the upwind and/or downwind side can be embedded close to or in the main laminate of the blade which easier can take up the loads from the bushings. Also, the highest loads occur in the upwind and downwind side of the blade wherefore a higher concentration of bushings here is advantageous. According to the invention this can be obtained at the same time as maintaining an even distribution of the bushings in the very root plane.

Yet a further embodiment relates to a blade for a wind power plant according to any of the above, where the root section of said blade is non-cylindrical. As mentioned above, a cylindrical root section is disadvantageous in yielding a certain length of ineffective blade with respect to power output. On the contrary, a non-cylindrical root section is advantageous in giving rise to a more gradual and natural shape change of the innermost section of the blade.

According to another aspect, the present invention also relates to a blade for a wind power plant comprising at least one insert in the root of said blade for attaching said blade to a hub, where said insert(s) comprise(s) at least two bores for fastening members to said insert, and where at least some of said bores are non-parallel. Fastening members are here and throughout the text members used to describe attachment means such as rods, studs, threaded bars and nuts, or bolts to be inserted into bushings, holes and/or inserts in the root section of the blade. By the above aspect of the invention is avoided that the large number of bushings are to be placed independently in the blade laminate during manufacture which may be a difficult and lengthy process to control and which is further complicated if some or all of the bushings are to be oriented in different directions according to the invention. Instead just one or a few inserts with bores corresponding to the bores in the bushings can be placed in the blade root section. Other advantages are obtained as described previously.

In another embodiment the at least one insert is at least partly embedded in the blade for the wind power plant according to the above, hereby yielding a strong connection between the blade and the insert(s).

Further, in another embodiment the at least one insert comprises a number of tongue-shaped wedges which is advantageous in decreasing any stress concentrations in the transition zones between the insert and the remaining of the blade.

The invention furthermore relates to a pitch bearing comprising a bearing ring with two or more holes for positioning fastening members for attaching a wind turbine blade to said pitch bearing, where at least two of said holes are oriented in different angles so that fastening members positioned in said holes will be non-parallel. This is advantageous in enabling the assembly to a wind turbine blade comprising bushings or inserts for fastening members as described above. The hereby obtained pitch bearing might result in a somewhat heavier construction than a conventional pitch bearing; however, the possible extra weight is placed relatively close to the rotational centre of the rotor. Further, the invention is advantageous in that the hub and bearings and bushings as such (dimensions, construction, etc) can all remain unchanged apart from the holes in the bearing ring connected directly to the blade, where the holes may be drilled in different directions.

According to another embodiment, the holes are made in the inner bearing ring of the pitch bearing according to the above. This is advantageous in that it results in a pitch bearing of lower mass than if the angled holes are made in the outer bearing ring.

According to another embodiment, the holes in a pitch bearing as described above are enlarged near a surface to obtain contact faces for the tightening members such as nuts and/or bolt heads of fastening members positioned in said holes.

The invention further relates to a hub for a wind power plant comprising at least one connection face with two or more holes for positioning fastening members for attaching a wind turbine blade to said connection face, where at least two of said holes are oriented in different angles so that fastening members positioned in said holes will be non-parallel. The advantages here are as described above for the pitch bearing.

According to another aspect, the invention relates to a method of producing a blade for a wind power plant comprising embedding a number of bushings in the root section of said blade, where at least some of said bushings are non-parallel. Hereby a wind turbine blade with the previously mentioned advantages can be obtained.

In a further embodiment, a method of producing a blade for a wind power plant according to the above further comprises at least partly embedding said bushings substantially along the blade surface.

In yet a further embodiment, a method of producing a blade for a wind power plant according to the above further comprises embedding at least one wedge behind said bushings, at least some of said wedges being of different lengths.

BRIEF DESCRIPTION OF THE DRAWINGS

In the following, preferred embodiments of the invention will be described referring to the figures, where.

DESCRIPTION OF PREFERRED EMBODIMENTS

Figure 1:
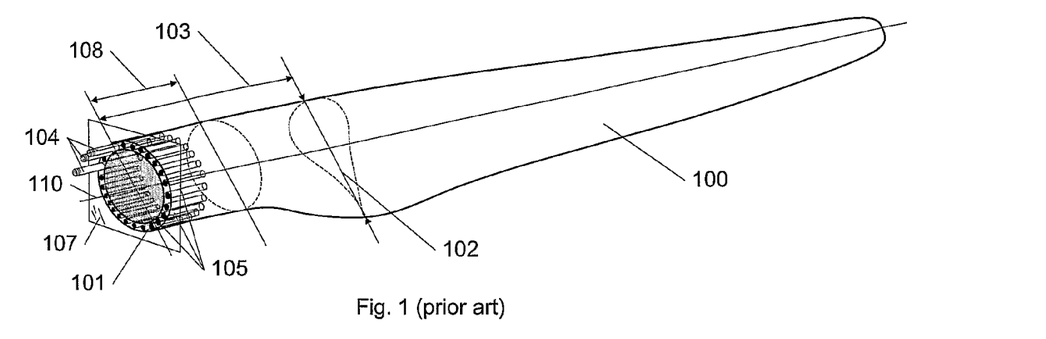
FIG. 1 shows a wind turbine blade as known in the art in a perspective view.

FIG. 1 shows, in a perspective view, a wind turbine blade 100 of which the most part is shaped according to aerodynamics to maximize the power uptake from the wind. The blade part from the root 101 to where the aerodynamical profile attains its maximum chord 102 is here and in the following referred to as the root section 103 of the blade. This section is generally shaped both with a view to aerodynamics, but also and primarily so that the blade assembly to the hub is optimally ensuring the best possible load transfer and minimal risk of damage and minimal wear of the blade, the fastening members 104 and the bearings in the hub. The blade is most often connected to the hub by a number of fastening members such as rods, studs, threaded bars and nuts, or bolts 104 (of which only a few are drawn for clarity) that are inserted into bushings 105 in the root section 103. If threaded bars are used, they might also be directly embedded into the blade laminate. The root end 101 is most often circular, fitting onto a circular bearing in the hub. The rods and bushings 105, of which there may be in the order of 40-60, are evenly distributed around the circular root 101, and extend in the same direction perpendicular to the root plane 107 and parallel to the pitch axis if the blade is pitch regulated. The part of the root section closest to the hub is shaped as a true or right circular cylinder 108 in which the bushings 105 are placed. The length of the root cylinder 108 is dimensioned by the necessary length of the bushings and the wedges. The root cylinder is then gradually changed into the aerodynamical profile in such a way that the outer geometry of the blade does not change too abruptly with too great curvatures. This, however, yields a section of the blade with relatively poor aerodynamical properties which especially is a problem at the trailing edge, where the shape of the blade surface changes the most.

Figure 2:
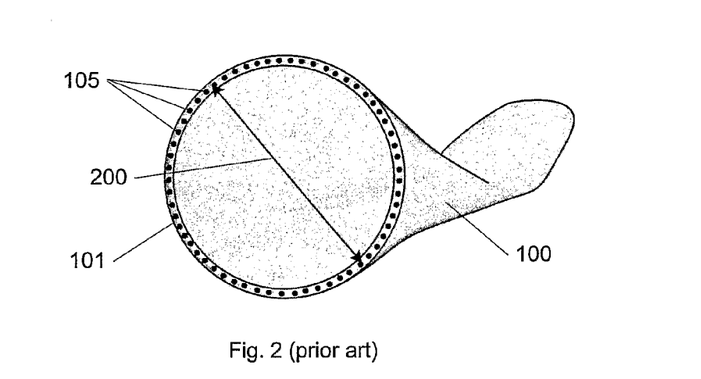
FIG. 2 shows a wind turbine blade as known in the art as seen from the root.

FIG. 2 shows a wind turbine blade 100 as illustrated in FIG. 1, but seen from the root 101. From this angle it is more clearly seen how the circular root cylinder 108 with the evenly distributed bushings 105 arranged and extending along the blade surface (the bushings are not placed in the surface but in a direction more or less parallel to the inner or outer surface of the blade) is changed and morphed into the aerodynamical blade profile further out the blade. The length of the maximum chord 102 is greater than the root diameter 200, whereas the thickness (height) of the blade profile is shorter than the root diameter. The circular root cylinder is thus morphed outwards in some directions and inwards in others.

Figure 3:
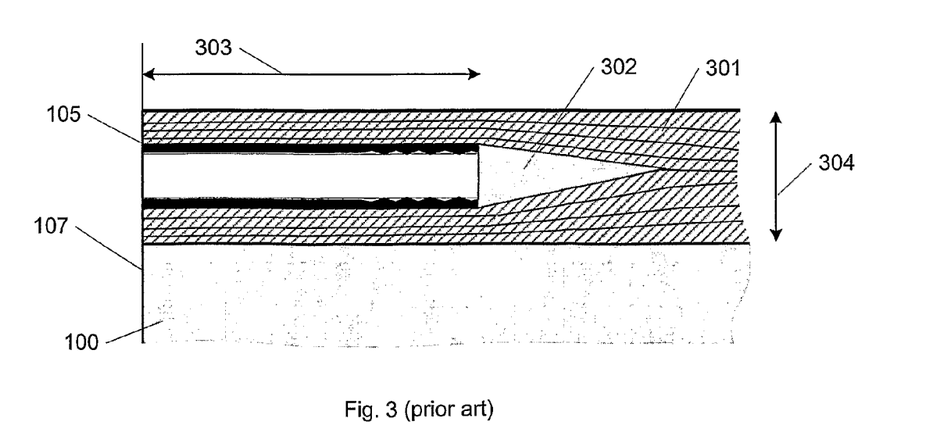
FIG. 3 shows a bushing embedded in the root end of a wind turbine blade as known in the art in a cross-sectional view.

In FIG. 3 is illustrated a bushing in the root of a wind turbine blade as seen in a cross-sectional view and according to prior art. The root solution for the blades needs to be robust in order to guarantee a proper connection of the long and heavy blade to the hub. The bushings 105 which for instance can be made of steel are here cast into and embedded in the root laminate 301 and form an integral part of the blade 100. The bushings are generally placed in the middle of the thickness 304 of the root laminate and in a direction perpendicular to the root plane 107 and parallel to the pitch axis of the blade; or in other words along the blade surface. At the back of each bushing is inserted a wedge 302 so that the laminate is only gradually opening up encasing the bushing, whereby the risk of delamination is decreased. The thicker the bolts and the bushings, the longer the wedges need to be. This in turn also implies that the length of the straight and right root cylinder 108 needs to be longer the longer and thicker the bushings; again to ensure a gradual change in the laminate before changing towards an aerodynamical profile shape. Also, the bushings need to be of a certain minimum length 303 in order to obtain the necessary pre-tensioning of the bolts when assembling the blade to the hub.

Figure 4:
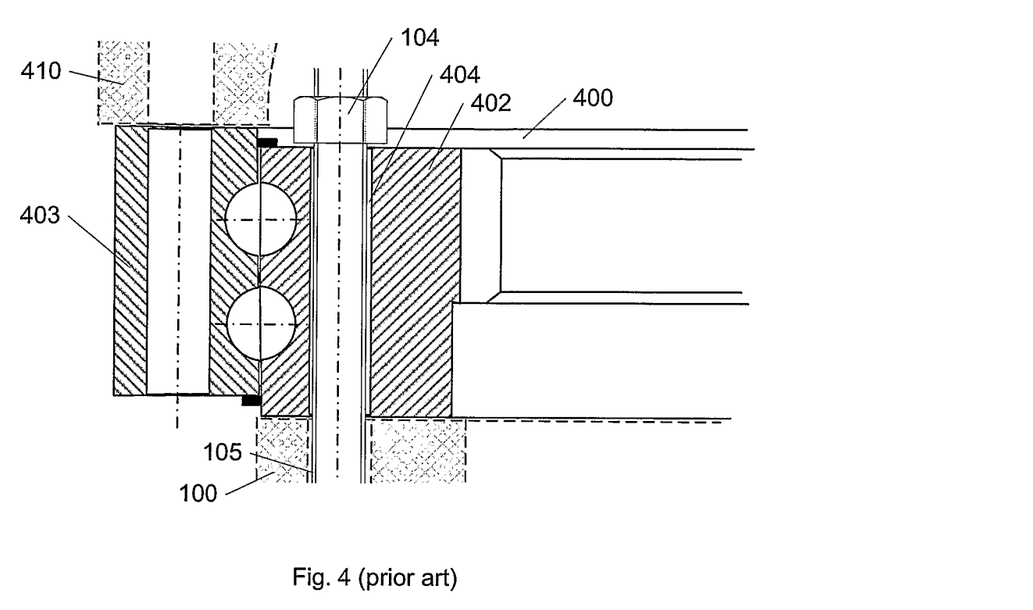
FIG. 4 illustrates a pitch bearing as known in the art in a cross-sectional view.

FIG. 4 shows a cross section of a part of a standard pitch bearing 400 in a hub. The bearing shown here is a ball bearing with balls between the inner bearing ring 402 which in this case is to be fastened to the blade 100 and the outer ring 403 connected to the hub 410. The blade 100 and the hub 410 positions are loosely indicated in the figure with hatched lines. The blade is connected to the hub by guiding the fastening members (e.g. bolts or rods) 104 all the way through the holes or bores 404 in the bearing ring 402 into the bushings in the blade, and tightening them from the inside of the hub. For illustrative purposes, a part of a bolt 104 is sketched in the figure in its tightened position in the bearing.

Figure 5:
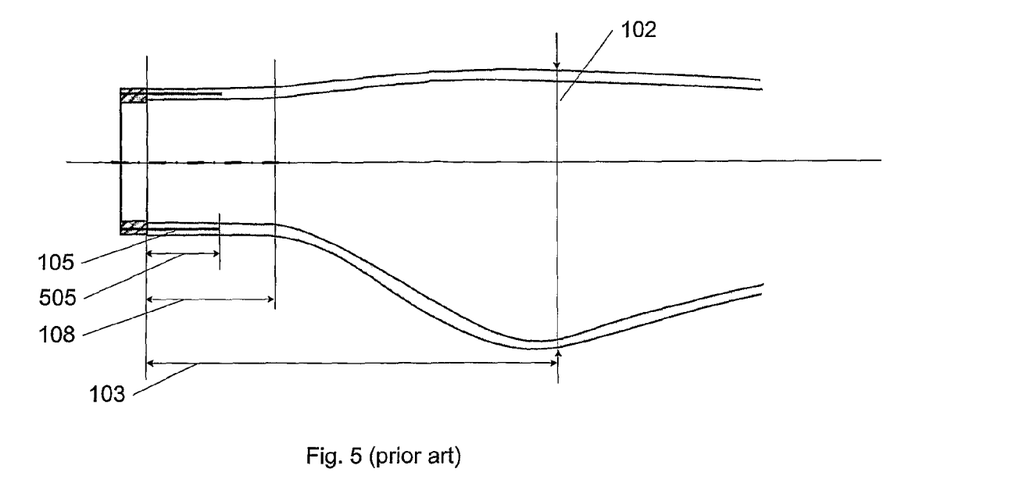
FIG. 5 is a sketch of a wind turbine blade as known in the art as seen in a cross-sectional view from the up or down wind side, FIGS. 6a and b are sketches of a wind turbine blade according to one embodiment of the invention as seen in a cross-sectional view from the up or down wind side and the trailing edge, respectively.

FIG. 5 is a sketch of a traditional wind turbine blade 100 as in FIG. 1, but seen in a cross-sectional view from above. Here it is clearly seen how the fastening members 105 of some length 505 are extending into the blade root section along the length of the blade. The circular, right cylinder 108 is often in the order of twice as long as the bushings 105. Hereafter the blade shape is gradually changed into the blade profile shape at 102, where the blade attains its maximum chord length.

The present invention solves the problem of obtaining a shorter root section of the blade and thereby getting the maximum chord closer towards the root. This is done by changing the assembly of the blade to the hub by turning the fastening members in the blade root in order to fit the natural shape of the outer geometry. This is illustrated in FIG. 6 and the following figures.

Figure 6A:
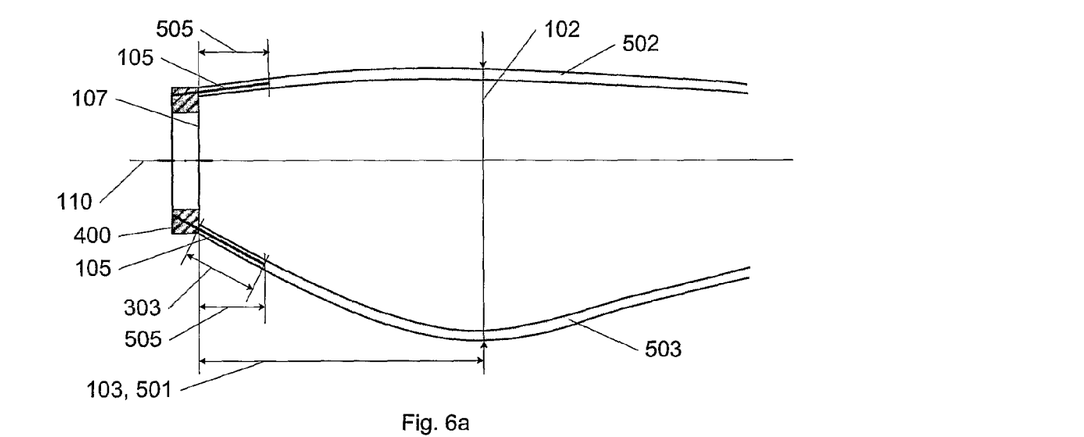
Figure 6B:
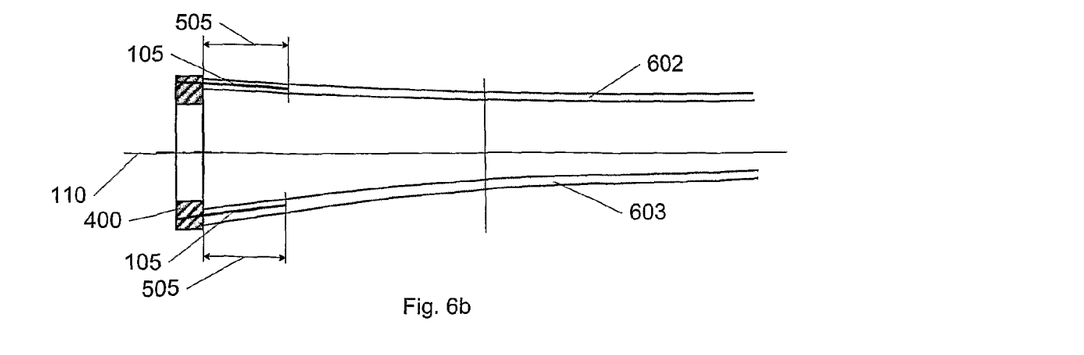

In the embodiment of the invention shown in FIGS. 6a and 6b, a wind turbine blade 100 is drawn as seen in a cross-sectional view from above and from the trailing edge, respectively. The blade in this embodiment still ends in a circular root in order to facilitate the assembly to a circular pitch bearing 400. The fastening members 104 and thereby also the bushings 105 are here allowed to extend in different directions and are not restricted to be parallel to any pitch axis 110 and/or perpendicular to the root plane 107. Hereby is obtained that the blade surface needs not any longer end in the shape of a right circular cylinder (as sketched in FIGS. 1-3), but can have non-zero slope or inclination in the root and even different inclination, e.g. at the trailing edge, along the upwind and downwind sides and at the leading edge as shown in FIGS. 6a-b. This is advantageous in increasing the design possibilities of the blade in its root section 103. As can be seen from the FIGS. 6a and 6b, the blade geometry can be changed and morphed from having an aerodynamical profile (at 102) into the circular root end over a much shorter length 501, which also becomes clear when compared to the corresponding cross-sectional view of a traditional wind turbine blade as sketched in FIG. 5. Thus, one can obtain the same power output with a shorter blade, thereby advantageously reducing the weight of the blade and the loads on the bearings, gears, tower construction, etc, or alternatively increase the power output for a blade of the same length.

The angled bushings are also advantageous in providing a better load transfer from the blade to the bearing, whereby the stresses in root are decreased. Further, the angled bushings allow the shape transition of the blade from the aerodynamical part to the root to be optimized into having a more natural shape with minimal curvatures and changes in inclination and slope which is advantageous in decreasing the risks of damage and wear in the laminate and increasing the laminates performance with respect to fatigue.

This design as described above in turn implies that the bushings 105 in and near the leading and trailing edges (502 and 503, respectively) are pointing outwards as can be clearly seen from FIG. 6a, whereas the bushings 105 in the up- and down wind side (602 and 603, respectively) are pointing inwards as seen in FIG. 6b. Some of the bushings might still be parallel to the pitch axis 110. In one embodiment of the invention, the angle between each bushing and the pitch axis is max +/−10°. In a further embodiment of the invention, the bushings are still evenly distributed in the circular root end 107 constituting the assembly plane between the blade 100 and the bearing 400 and the hub.

As mentioned previously, the bushings are required to be of a certain length 303 in order to be properly anchored within the blade laminate and in order to be able to obtain the necessary pre-tensioning of the fastening members. However, as the bushings 105 according to this invention are angled, the effective lengths 505 of the bushings along the length of the blade are shorter, whereby the root section can be shortened even more getting the aerodynamical profile of the blade even closer to the root. A further aspect to take into account is that the wedges 302 may take different shapes depending on which bushings they should join, both with respect to length and thickness. Also, the wedges need not be straight anymore, but can advantageously be curved if the laminate is curved.

The bushings need not be placed exactly between the central layers in the blade laminate, but can optionally be embedded closer to either the interior or exterior of the blade. Similarly, the bushings might also to some extent be angled or placed askew relative to a laminate direction. In a further embodiment of the invention, the bushings are embedded in the blade laminate protruding a little from the root end. The extra length of the bushings are then advantageously cut or milled off, for instance when the root end of the blade is leveled. In this way standard and equal bushings can be applied independent of how they are to be placed and how they are tilted in the blade.

Figure 7:
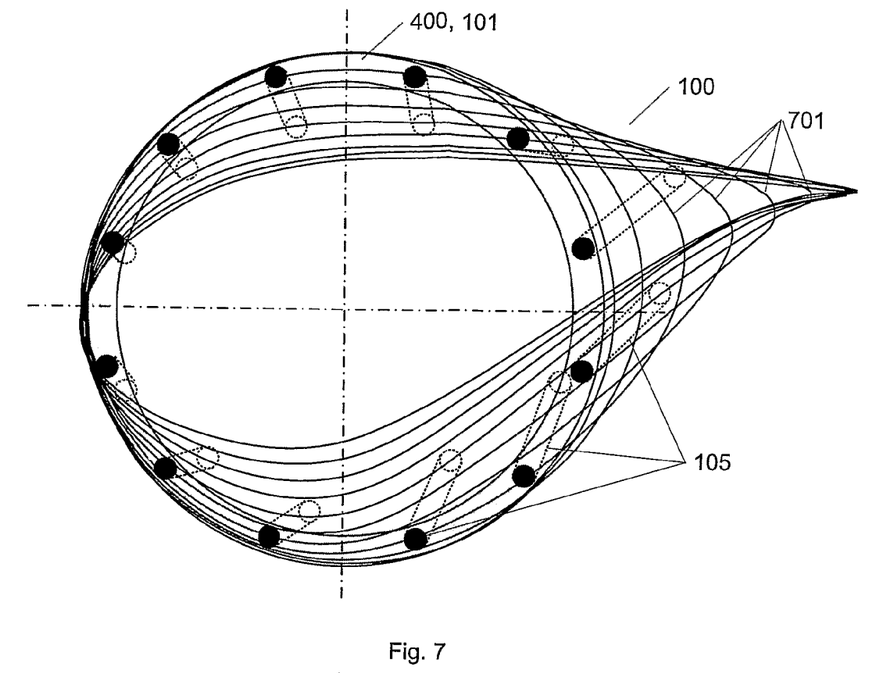
FIGS. 7 and 8 illustrate a wind turbine with a number of bushings as seen from the root end according to different embodiments of the invention.
Figure 8:
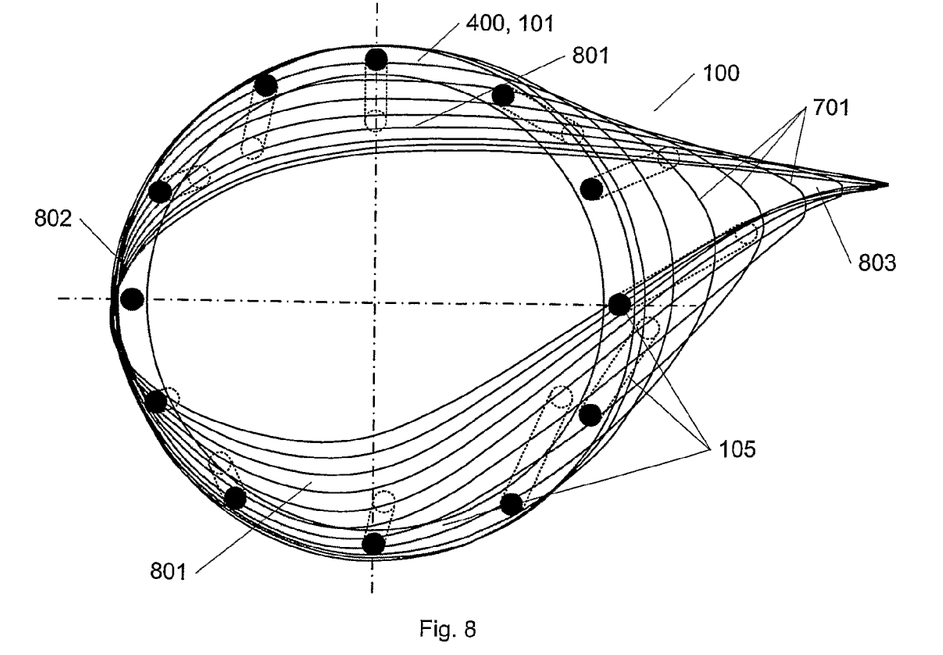

FIGS. 7 and 8 illustrate how the bushings can be arranged in a blade root according to different embodiments of the invention. In both figures a wind turbine blade 100 is seen from its root end with a circular pitch bearing 400 and a number of profiles or airfoils 701 from different positions drawn up showing the blade design in the root section. For clarity only a relative few bushings 105 are sketched and their positions are shown in hatched lines. In FIG. 7 the bushings 105 are evenly distributed in the root end and extend in different directions both following the shape of the blade and staying more or less evenly distributed at the different profile positions. The exact positions and directions of the different bushings are not the main issue, but rather the general idea that they can be angled relative to each other, which again opens up for far more possibilities for designing the blade root, for instance with the purpose of e.g. minimizing the stresses in the root end and/or optimizing the power output extracted from the wind.

Another embodiment of the placing of the root bushings 105 is shown in FIG. 8. A wind turbine blade 100 is sketched and viewed from the same point of view as in the previous FIG. 7. Again, the bushings 105 are distributed approximately evenly in the circular root end 101. However, here the bushings are not kept evenly distributed around a blade profile 701 in the root section further down the length of the blade. Instead the bushings are further spaced apart in the main laminates of the blade shell, i.e. typically along the up and down wind sides of the profile 801 and for some blades also in the leading edge 802. Here, the laminate and the blade shell is thicker and the bushings placed here are therefore better embedded and capable of transferring higher loads from the fastening members in the bushing to the surrounding blade. The bushings therefore need not be placed that close. The opposite is the case in the typically thinner trailing edge 803 and regions between the leading edge and principal laminates, where the bushings therefore advantageously may be placed more close as illustrated in FIG. 8.

Figure 9:
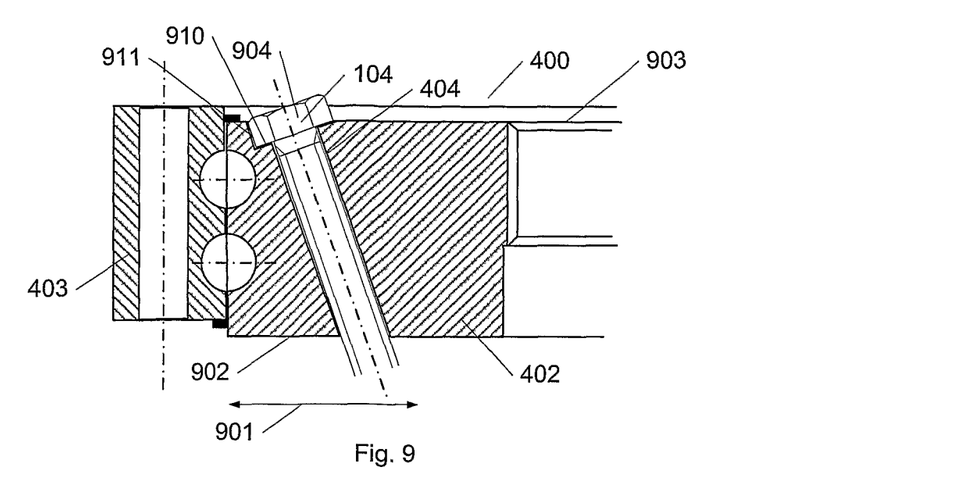
FIGS. 9 and 10 illustrate a pitch bearing with a fastening member.
Figure 10:
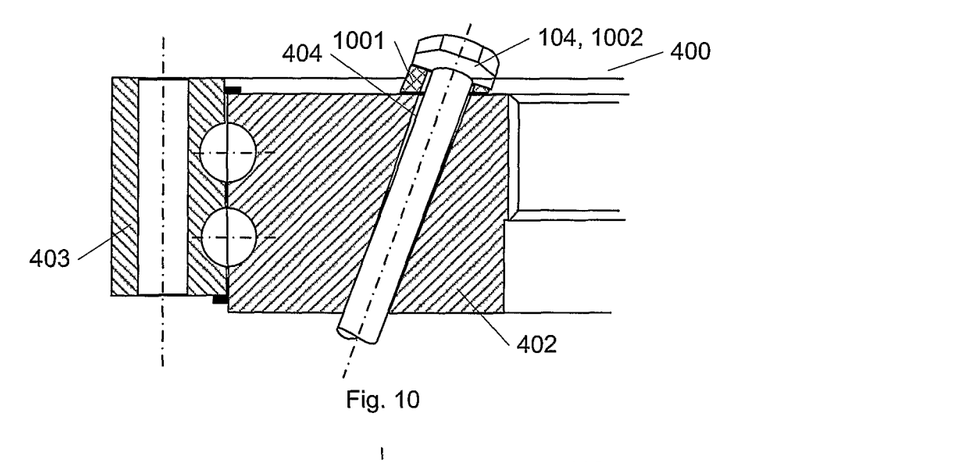
Figure 11:
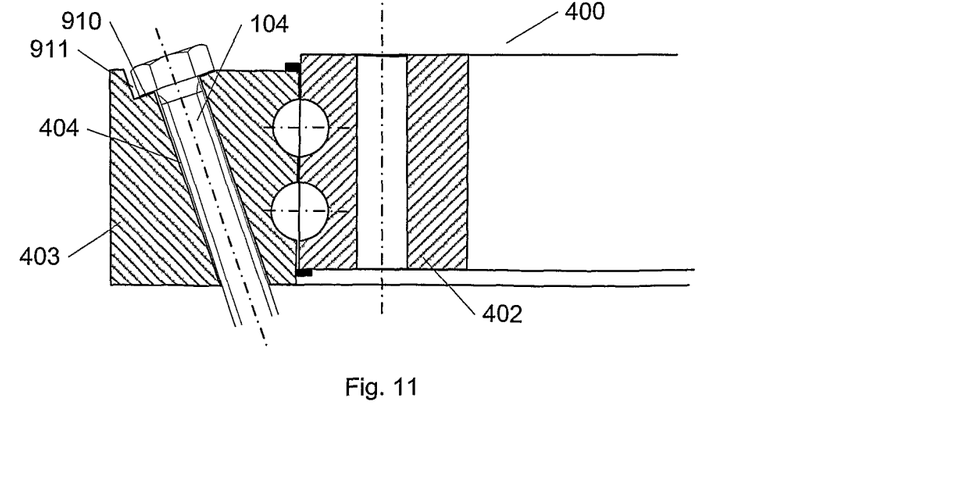
FIG. 11 illustrates another embodiment of pitch bearing with a fastening member.

FIGS. 9-11 show different embodiments of pitch bearings 400 adapted for the assembly of a wind turbine hub to a wind turbine blade with angled root bushings and/or fastening members according to the above. As the root bushings 105 in the blade root section extend in different directions, so do the fastening members 104 and these are therefore guided through holes 404 in the blade bearing 400 which are angled correspondingly. In the embodiments shown in FIGS. 9 and 10, the wind turbine blade is connected to the inner bearing ring 402, and the pitch bearing is in this case a ball bearing. The pitch bearing could of course equally well be of another type such as e.g. a roller bearing or a journal bearing. As the holes 404 for the fastening members 105 in the bearing ring 402 are angled, the bearing ring 402 will most likely have to be made of a greater width 901 than is the case with a conventional bearing ring. This leads to an increase in weight of the bearing ring, and it is therefore advantageous to connect the blade to the inner bearing ring instead of to the outer bearing ring 403 as illustrated in FIG. 11. However, both possibilities are absolutely feasible.

The fastening members may be distributed in the bearing ring so that they are equally spaced apart at for instance the outer surface 902 of the bearing ring, which also makes the entries to the root bushings evenly distributed in the root end of the blade. Alternatively the fastening members may be evenly spaced apart at the inner surface 903 of the bearing ring, making the nuts or bolt heads evenly distributed. In yet a further alternative, the fastening members are not evenly distributed but instead distributed for instance with a view to the actual load distribution in the bearing ring.

In order to obtain a contact face 910 for the tightening of the fastening members, the holes 404 in the bearing ring have been enlarged 911 (e.g. by drilling) at the inner surface 903 to accommodate for the nuts or bolt heads 904. This is also shown in FIG. 11. In the embodiment shown in FIG. 10, a wedge shaped washer 1001 is applied instead of the assembly.

As the bushings and the fastening members are angled according to the local shape of the blade, the fastening members can extend in both outwards and inwards directions. Therefore, also the corresponding holes 404 in the bearing ring extend in different directions both inwards and outwards as illustrated in FIGS. 9 and 10, respectively. Further, the holes (and fastening members and bushings) are not restricted to be placed in radial planes (as also mentioned previously) which is illustrated in FIG. 10, where an angled bolt 1002 is sketched as placed in the cut through hole 404 in the bearing ring.

In FIG. 11 is shown an embodiment of a pitch bearing 400, where the blade is to be fastened to the outer bearing ring 403.

Figure 12A:
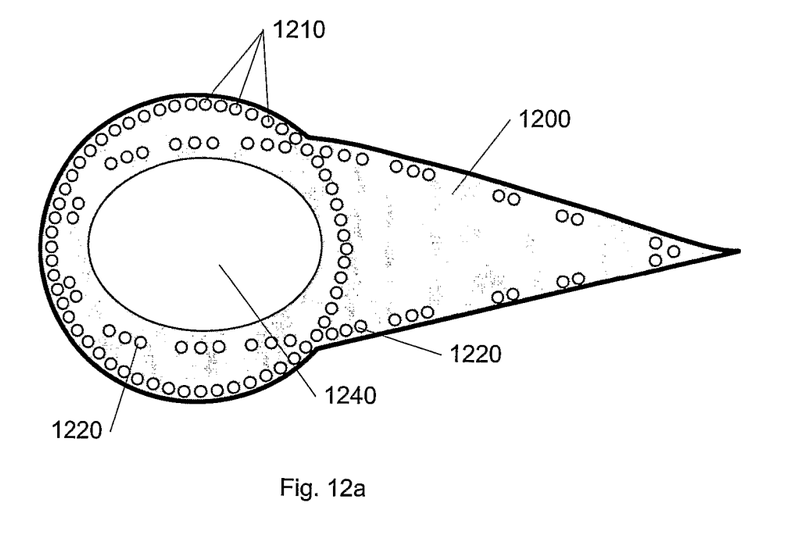
FIGS. 12-14 illustrate different embodiments of a root plate or block for fastening a wind turbine blade to the hub.

In another embodiment the blade is connected to the hub and optionally a pitch bearing by means of a root plate or connecting member with the same objective as previously of getting the maximum chord of the blade closer to the hub. FIG. 12a illustrates an end view of a root plate 1200 facing the blade (not shown), connecting the blade to the hub bearing (not shown). The end of the root plate 1200 facing the blade advantageously has an outer shape corresponding to the cross section of the blade at its maximum chord, and the end facing the hub bearing (not shown) is circular. The root end of the blade (not shown) has been arranged with a number of bushings (not shown), which as described previously may be angled or tilted relative to each other following the shape and geometry of the blade. An embodiment of a root plate where this is the case is sketched in FIG. 13.

The end of the root plate facing the blade root comprises a number of holes 1220 arranged correspondingly to the bushings in the blade. First, fastening members such as threaded bars (not shown) are fastened in the blade bushings and extend through the holes 1220 in the root plate 1200 and are fastened hereto e.g. with nuts. The end of the root plate facing the hub bearing likewise comprises holes 1210 with or without female threading for fastening the root plate 1200 to the hub bearing 400. If the holes 1210 are with female threading, threaded bars can be mounted in the holes 1210 and the root plate 1200 fastened to the hub bearing with nuts (not shown) from the inside of the hub. If the holes 1210 are without female threading, threaded bars, bolt or rods can be led through the these and fixed on the blade side of the root plate with nuts and fastened to the hub bearing with nuts (not shown) from the inside of the hub.

Figure 13:
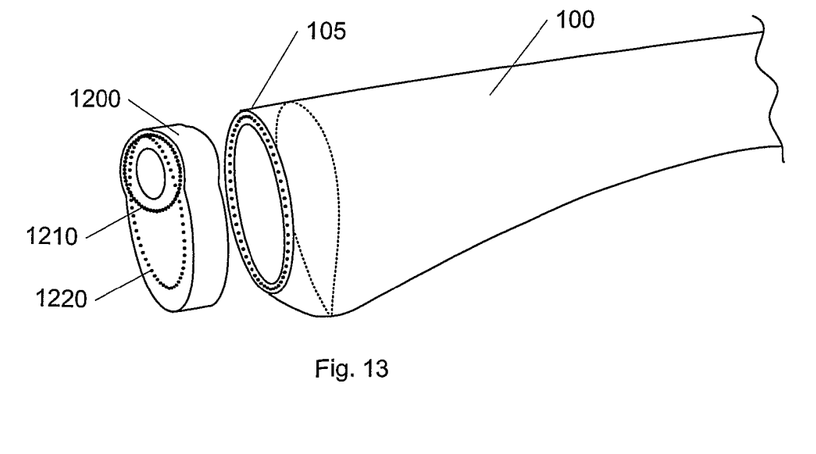

The bushings 105 in the blade, the holes 1210, 1220 in the root plate 1200 and the holes (not shown) in the hub bearing can all be arranged and oriented such that an optimal load distribution can be obtained, and not necessarily, as traditionally, parallel to the longitudinal axis of the blade or to the pitch axis as also illustrated in the embodiment shown in FIG. 13.

Further, the holes 1220 for fastening the blade 100 to the root plate 1200 do not have to be evenly distributed along the surface of the blade root end, but can advantageously be distributed to optimize the load transfer from the blade 100 to the hub bearing. Further, in order to minimize the weight of the root plate and improve its ability to transfer the loads of the blade to the hub unnecessary material (e.g. 1240) can be removed, giving the root plate a grated or bar-like structure. Excess material on the outer surface of the root plate 1200 can also be removed, optionally giving the root plate 1200 a cone-like shape. After mounting the blade to the hub bearing using the root plate 1200, the optionally open structure of the root plate 1200 can be closed or sealed to avoid that water, snow or other undesired particles can enter the inside of the blade. The root plate 1200 can be of e.g. metal and must be able to transfer the high loads over a relatively very short distance between the blade 100 and the hub.

Figure 12B:
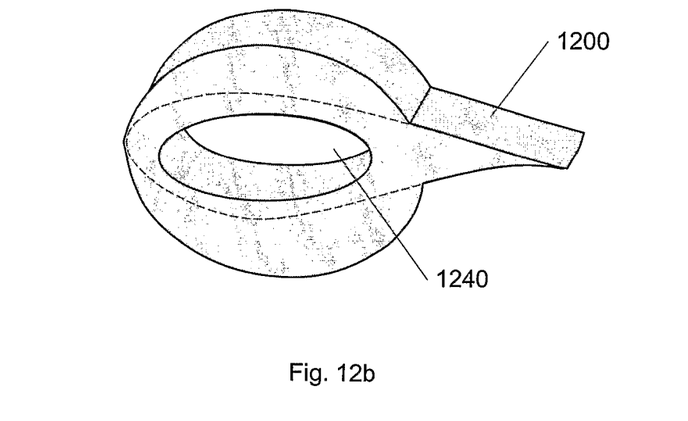

FIG. 12b illustrates a rough sketch of a root plate 1200 in a perspective view. The sketched root plate 1200 can comprise all the features described in FIG. 12a. The dotted line indicates the intended position of the blade (not shown). In order to e.g. minimise the weight of the root plate 1200, excess material has been removed, e.g. 1240.

Figure 14:
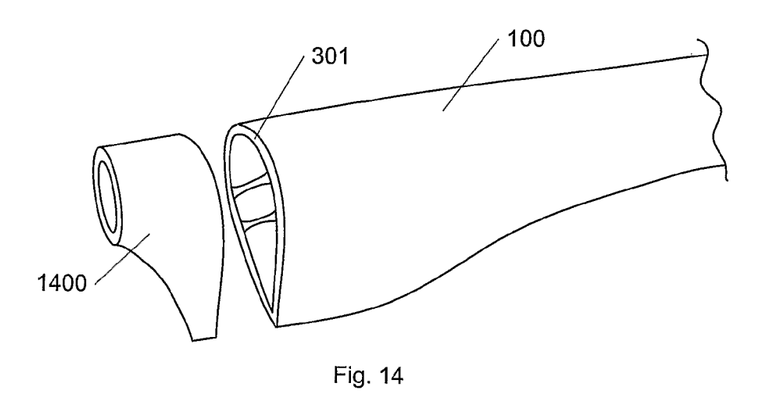

FIG. 14 illustrates an exploded perspective of a root block 1400 and the root end of a wind turbine blade 100. The root block 1400 serves the same purpose as the root plate 1200 which is to reduce the distance from the hub bearing (not shown) to the maximum chord of the blade 100. Compared to the root plate 1200, the root block 1400 has a more aerodynamic construction and design. Like the root plate 1200, the root block 1400 also comprises holes (not shown) with and/or without female threading used for fastening it to the blade 100 and hub bearing. These holes can be through going depending on the means with which they are fastened to the blade 100 and hub bearing. Furthermore, these holes can be arranged in a way that provides an optimal distribution of the loads on the blade 100 to the hub bearing. This means that the holes in the root block 1400, bushings in the blade root and holes in the hub bearing can be oriented according to such a load distribution and thereby not necessarily along the longitudinal axis of the blade 100. As described earlier (FIGS. 12a and b), the holes in the root block 1400 for fastening the blade 100 and the bushings in the blade do not need to be distributed evenly along the outer surface of the blade 100 and root block. Again, important design parameters are optimal load distribution and optimal aerodynamics. The root block 1400 could e.g. be made of metal or a fibre reinforced material and must as the root plate 1200 be able to transfer the high loads over a relatively very short distance.

Figure 15:
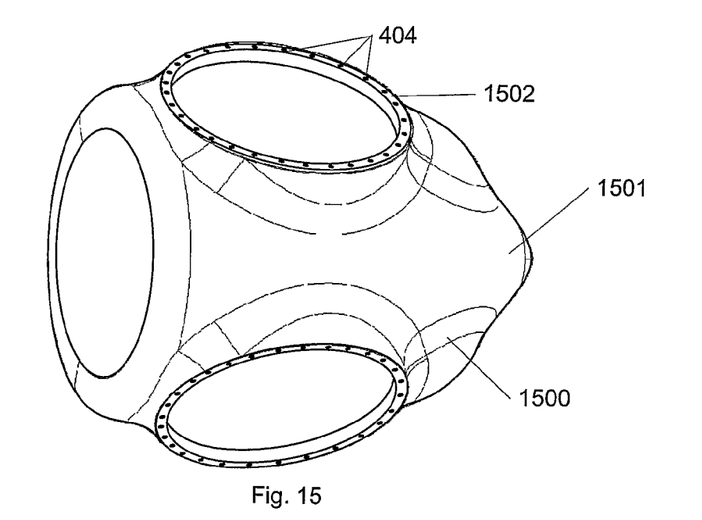
FIG. 15 is a sketch of a hub.

FIG. 15 shows a hub 1500 for a wind power plant with a spinner 1501 barely visible and the connection faces 1502 onto which the blades are fastened. In this embodiment the wind power plant and the hub 1500 do not comprise a pitch bearing. Instead the blades are assembled onto the hub by a number of fastening members such as bolts being inserted through holes or bores 404 made either directly in the hub or indirectly in a part subsequently fastened onto the hub (optionally via a bearing). The holes 404 (or at least some of them) are according to the invention oriented in different angles and non-parallel, enabling the fastening members to extend in correspondingly different directions. Hereby, as also discussed previously, the blade is no longer constrained to end in a straight or right cylinder, but can be given a more natural shape while at the same time still having the fastening members follow the surface shape of the blade. Further, according to another embodiment of the invention, the connection faces 1502 on the hub need not be circular, but can for instance instead be given a profile outline. Similarly, the root end of the blades need not be circular if the blade is not to be mounted in an ordinary pitch bearing with holes arranged in a circle. The hub shown is for a tree-bladed wind turbine, but can similarly be designed for another number of blades without departing from the scope of the invention.

Figure 16:
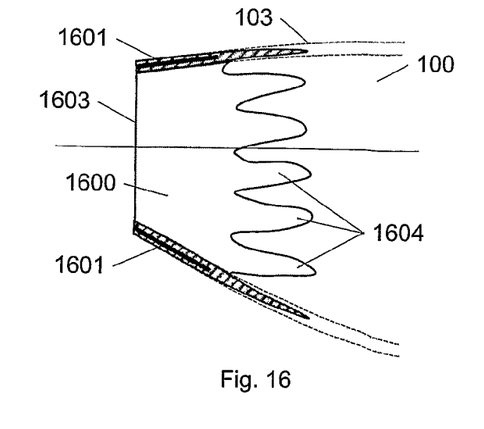
FIG. 16 illustrates a bushing insert with threaded bores according to one embodiment of the invention.

FIG. 16 shows an embodiment of the invention, where the blade 100 comprises an insert 1600 in the root section 103. The insert 1600 solves the problem of having to place an often rather large number of bushings (often in the order of 50-100) as accurately as possible in the blade laminate during manufacture of the blade shells. This is further complicated if some or all of the bushings are non-parallel. The insert 1600 replaces all or some of the bushings. The insert then comprises a number of bores or holes 1601 angled in directions according to the shape of the blade 100. The fastening members (not shown) for assembling the blade to the hub are then fastened to the holes or bores 1601 which can be threaded. The insert 1600 can be connected to the remaining part of the blade in various ways, for instance by being partly embedded into the blade laminate as sketched in the figure. In another embodiment the insert is fully embedded and integrated into the blade laminate with only the root end 1603 and the bores visible. In a further embodiment the insert consists of multiple parts instead of only one as sketched in the figure. Also the insert(s) can comprise a number of tongue shaped wedges 1604 making the transition from the insert(s) into the blade laminate more gradual, thus minimizing or avoiding stress concentrations in the blade root section.

Figure 17:
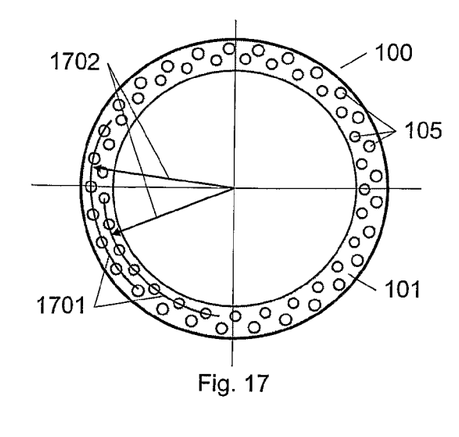
FIG. 17 illustrates an embodiment of a blade root end with bushings placed in a formation of multiple concentric circles.

Finally, instead of placing the bushings 105 so that they end evenly distributed in a circle in the root 101 as for instance sketched in FIGS. 2, 7 and 12, the bushings can alternatively be placed in two or even more concentric circles 1701 of different radii 1702;—the outer bushings shifted relatively to the inner bushings as shown in FIG. 17. Hereby is obtained a closer packing of the bushings for a blade root of a given diameter. Of course, the holes or bores in the hub or the pitch bearing through which the fastening members are to be guided are then also to be made in a pattern of two or more concentric circles corresponding to the pattern of the bushings. Even more general and still within the scope of invention, the bushings and the corresponding holes or bores in the hub or the pitch bearing can be placed in any general pattern (and thus not necessarily evenly distributed in one or more concentric circles) e.g. out of considerations to the load distribution or the geometry of the blade root and/or hub or pitch bearing.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim.

The invention claimed is:

1. A blade for a wind power plant comprising at least two bushings in the root of the blade for attaching the blade to a hub and where the bushings are placed along the blade surface, characterized in that at least some of the bushings are non-parallel,
   wherein at least some of the bushings are placed closer to each other in the upwind and/or downwind side of the blade.

2. The blade for a wind power plant according to claim 1, wherein the bushings are unevenly distributed in the root end of the blade.

3. The blade for a wind power plant according to claim 1, wherein the root section of the blade is non-cylindrical.

4. A blade for a wind power plant comprising at least one insert in the root of the blade for attaching the blade to a hub, where the insert(s) comprise(s) at least two bores for fastening members to the insert, characterized in that at least some of the bores are non-parallel,
   wherein the at least one insert comprises a number of tongue-shaped wedges.

5. The blade for a wind power plant according to claim 4, wherein the at least one insert is at least partly embedded in the blade.

6. A pitch bearing comprising a bearing ring with two or more holes for positioning fastening members for attaching a wind turbine blade to the pitch bearing, characterized in that at least two of the holes are oriented in different angles so that fastening members positioned in the holes will be non-parallel,
   wherein the holes are enlarged near a surface to obtain contact faces for the tightening members such as nuts and/or bolt heads of fastening members positioned in the holes.

7. The pitch bearing according to claim 6, wherein the holes are made in the inner bearing ring of the pitch bearing.

8. A hub for a wind power plant comprising at least one connection face with two or more holes for positioning fastening members for attaching a wind turbine blade to the connection face, characterized in that at least two of the holes are oriented in different angles so that fastening members positioned in the holes will be non-parallel,
   wherein the holes are enlarged near a surface to obtain contact faces for the tightening members such as nuts and/or bolt heads of fastening members positioned in the holes.

9. A method of producing a blade for a wind power plant comprising embedding a number of bushings in the root section of the blade, where at least some of the bushings are non-parallel and embedding at least one wedge behind the bushings, at least some of the wedges being of different lengths.

10. The method of producing a blade for a wind power plant according to claim 9, further comprising embedding the bushings substantially along the blade surface.

11. A blade for a wind power plant comprising at least two bushings in a root of the blade for attaching the blade to a hub and where the bushings are placed along a blade surface, characterized in that at least some of the bushings are non-parallel, wherein the blade further comprises at least one wedge embedded behind the bushings, at least some of the wedges being of different lengths.

* * * * *